Figure 1:
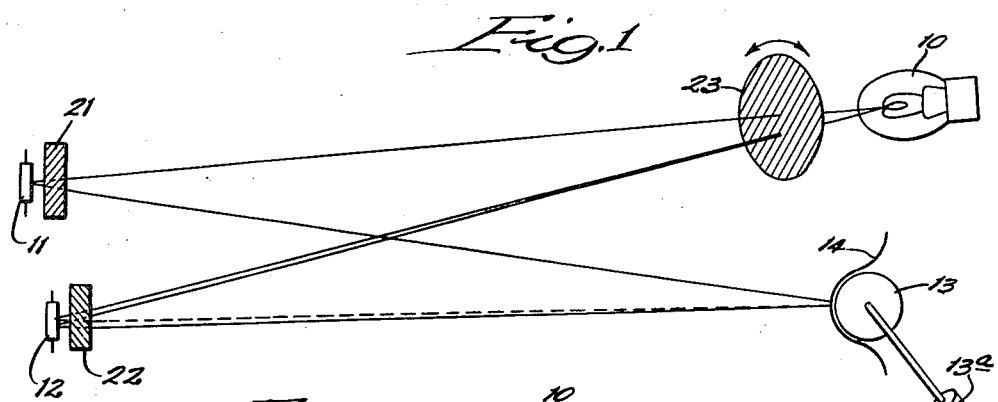

Sept. 16, 1958   C. E. STUFFLEBEAM ET AL   2,852,330
RECORDING METER

Filed June 30, 1954

INVENTORS:
Clyde E. Stufflebeam and
BY James L. Fisher,
Orme, McDougall, Williams & Hersh.
ATTORNEYS.

United States Patent Office 2,852,330
Patented Sept. 16, 1958

2,852,330

RECORDING METER

Clyde E. Stufflebeam and James L. Fisher, Tulsa, Okla., assignors to Century Geophysical Corporation, Tulsa, Okla., a corporation of Delaware Application June 30, 1954, Serial No. 440,478

7 Claims. (Cl. 346—109)

This invention relates broadly to the field of recording meters, and it is particularly concerned with improvements in recording meters of the type wherein a record is made on a single film, alternatively, of the reading or needle position of more than one instrument.

Our invention is addressed to the manner of selecting and recording meter indications, rather than to the particular type of meters whose readings are being recorded. In many applications, of course, the meter elements will be D'Arsonval moving-coil galvanometers. In other applications, however, the instruments whose readings are being recorded may be mechanical pressure gauges or other indicating devices. Therefore, in the present specification, we shall refer broadly to "meters" and "meter dials," with the understanding that such reference is intended to embrace all types of indicating instruments wherein some mechanical, electrical, or chemical condition is indicated by the position of a moving element.

Instruments of the broad class to which our invention relates normally comprise a plurality of meter elements, which may range in number from one to fifty or more, one or more light sources, and a photographic recording instrument, wherein a photo-sensitive film is advanced at a controlled rate past a recording position or station. Each of the meter elements is provided with a light-reflecting element the position of which changes with changes in the electrical, mechanical, or chemical condition being metered. When the reading of a particular meter is being recorded, light from the light source is directed on the meter face, and a narrow beam of light, reflected therefrom toward the recording position, causing a spot of light to appear on the portion of the photographic film or sensitized paper which is occupying the recording position at that moment. The position of the spot on the film or paper provides a record of the meter reading as of that moment. As the paper continues to move past the recording position, its successive exposure to the spot of light from the meter will produce on the film a line effectively plotting the meter reading as a function of time.

In practice, the width of the row of film or paper on which the photographic record is made can be several times that needed for recording the readings of any particular meter. By directing the light beams from various meters onto the sensitized sheet at intervals spaced across its width, it is thus possible to record simultaneously the readings of a substantial plurality of meters.

In many cases, however, the number of meters to be recorded is substantially greater than the available capacity of the sensitized sheet, with the result that time-sharing must be employed. Prior-art techniques for accomplishing such time-sharing involved the use of individual mechanical shutters associated with the respective meter elements. This method was complex and cumbersome.

Broadly speaking, economy in utilization of sensitized film or paper makes it desirable that all the meters being recorded at a given time have roughly similar time-scale characteristics. That is, some conditions being metered may change rather rapidly and require, therefore, a rather rapid rate of film travel to produce a record containing adequate detail. Other metered conditions, on the other hand, may change very slowly, so that a satisfactory record may be made with a much slower rate of film travel.

The sensitized film or paper may be most efficiently utilized, therefore, if all the meters being recorded at a given time call for substantially equal speed of film travel. In most applications, it is possible to group the various meters to be recorded into a small number of classes, with respect to film speed. In many cases, the meters can successfully be grouped into two classes—a high-speed class and a low-speed class. In almost all cases, the meters can be grouped into at most three or four speed classes.

In the past, when division of a group of meters into classes by film speed has been desired, the only means available for acomplishing such classification consisted of individual light stops or shutters in front of each meter element. In switching from, for example, the high-speed recording rate to the low-speed recording rate, the operator had to actuate individually the shutters on the various meters. Where, as was often the case, the number of meters totalled forty or fifty, this was a burdensome and time-consuming job.

The primary object of the present invention is to provide a recording meter wherein an instant selection may be made between one group of meters and another group of meters without the necessity for individual adjustments at the respective meters, and in which, if desired, such instant selection may be made automatically in synchronization or coordination with the speed control on the film-driving mechanism.

More specifically, it is an object of the present invention to provide an arrangement under which the meters whose readings are to be recorded are provided with light-polarized covers, the axis of polarization in each case depending on whether that meter falls into the high or low group with respect to film speed.

In conjunction with the foregoing, another object of the present invention is to provide a recording meter wherein the primary light source is provided with an adjustable polarized filter, and wherein the selection between one group of meters and another, for selective recording purposes, may be made merely by appropriate adjustment of the polarized filter associated with the light source.

Another object of our invention consists in providing a recording meter employing polarized filters as above described, wherein trace identification of particular meters may be accomplished by means of a systematically moving polarized filter.

Still another object of our invention is to provide, in a recording meter of the type above described, a means, also employing polarized light filters, by which, as recording speed is changed, the illumination intensity can be automatically adjusted to the correct value for proper film exposure, without necessity for changing lamp voltage or current.

Other objects and advantages of the invention will be apparent from the detailed specification which follows.

Figure 2:
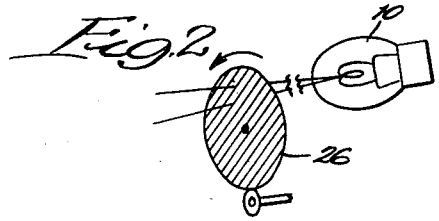
Figure 3:
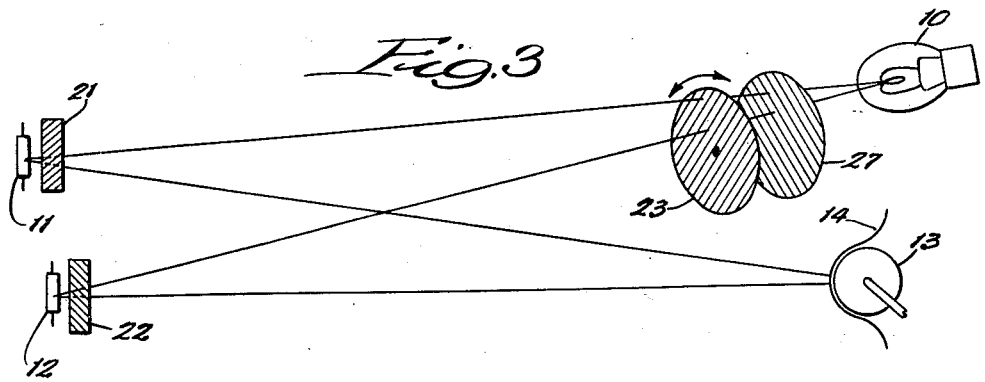
Figure 4:
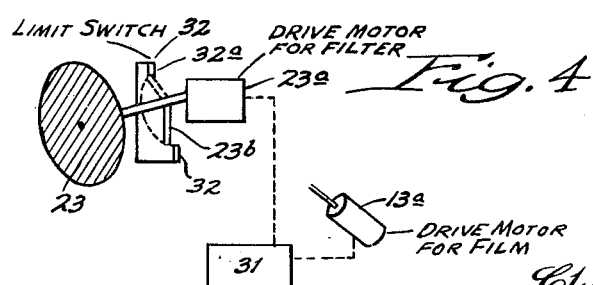

The appended drawing is intentionally diagrammatic, for the sake of clarity and simplicity. Details of mechanical actuating devices, etc., have been omitted from the drawing, since they may be conventional and form no part of the present invention. Figure 1 is a diagrammatic showing of an arrangement embodying the basic principles of the present invention. Fig. 2 is a diagrammatic figure showing a refinement on the system of Fig. 1 wherein a polarized light filter is used for purposes of trace identification. Fig. 3 is a diagrammatic showing generally similar to Fig. 1 but incorporating an additional refinement by means of which the intensity of illumination may be automatically adjusted to optimum value as recording speed is changed. Fig. 4 is a diagrammatic figure indicating another means by which the intensity of illumination may be automatically adjusted as the recorded speed is changed.

In Fig. 1, we have shown, diagrammatically, the basic components of a recording meter, comprising light source 10, meters 11 and 12, motor-driven drum 13, and sensitized paper or film 14.

For purposes of illustration, the meters 11 and 12 have been diagrammatically portrayed as movable mirrors, normally rotated by means of galvanometer movements. It will be understood that the manner of actuation of the mirrors will depend on the nature of the conditions being metered.

It will also be understood that the meters schematically indicated on the drawing are to be regarded as representative of any desired number of such instruments. Broadly speaking, for purposes of the present description, it may be understood that meter 11 is representative of all the meters in a given bank whose readings may conveniently be recorded at a slow film speed, while the meter 12 may be taken as representative of the meters in such bank whose readings must be recorded at a higher film speed.

(In referring to "film speed," it will be understood that we have reference to the speed of movement of the particular recording medium being employed. In some instances that may be a film in the ordinary sense, although more commonly it will be a roll of photo-sensitive paper.)

In front of each of the meters 11, we provide a polarized filter 21, and in front of each of the meters 12, we provide a polarized filter 22, the filters 21 and 22 having their respective axes of polarization substantially perpendicular to one another.

At a convenient point between light source 10 and the meters 11 and 12, we interpose a rotatable polarized filter 23, which may be mounted in a manner to permit rotational freedom through an arc of at least 90°.

The details of mounting of the filter 23 are not critical, but it should preferably have two normal positions, in one of which filter 23 is positioned so that its axis of polarization is substantially parallel to that of the filters 21, while in the other position its axis of polarization is substantially parallel to that of the filters 22.

The rotation of filter 23 between its respective positions may either be accomplished manually, as by a hand lever, or it may be accomplished by a motor or other automatic means under the control of the same control mechanism that shifts the speed of the motor 13a which drives the drum 13.

In operation, the system of Fig. 1 functions as follows: Assume the instrument has been recording at its lower speed the readings of the various meters 11, and it is desired to shift to the higher recording speed. The speed control of motor 13a is actuated to increase the speed of travel of the film 14, and at substantially the same time the filter 23 is rotated through an arc of approximately 90°. The result is immediately to discontinue recording of the readings of all the meters 11 and to substitute therefor a new set of traces representing the readings on the various meters 12.

If desired, as pointed out above, the rotation of filter 23 may easily be made to take place automatically upon the shift in speed of the film drum 13. One means of accomplishing that result might consist in providing an electric motor drive for filter 23, the driving motor being started by the same manual control used for changing the speed of drum 13 and being automatically stopped, when the filter 23 reaches the proper position, by means of a conventional limit switch which, at the same time it stops the driving motor, also reverses its direction so that, when next started, the driving motor will turn the filter in the other direction. Such an arrangement is diagrammatically indicated in Fig. 4, wherein a drive motor 23a is shown for the filter 23, the limits of rotation of the filter responsively to motor operation being determined by conventional limit switch 32, having a pair of pressure-responsive sections 32a and 32b which are actuated by means of a rotary control arm 23b projecting from the shaft of motor 23a. A manual speed-change control 31 is provided for film-drive motor 13a, and the same control 31 is operative to start the motor 23a whenever the speed of motor 13a is altered. The angular positions of the control sections 32a and 32b of limit switch 32 are placed appropriately, with respect to arm 23b, so that the filter 23 will be positioned to pass, for each film speed, a quantity of light proportional thereto.

Since the electrical details of the arrangement shown in Fig. 4 are conventional and do not per se form a part of the invention, the wiring is omitted.

Fig. 2 shows an arrangement which may be used to provide a definite trace identification on the sentized film or paper for a given meter or group of meters. It consists of a polarized filter 26 interposed at a suitable point in the path of the light beam between source 10 and the meter whose trace is to be given a distinctive identification.

As persons familiar with the behavior of polarized filters will understand, the rotation of filter 26 will cause the brightness of the spot reflected from the meter under consideration to vary as a function of time, at a rate governed by the rotational speed of the filter 26. This, of course, will result in a trace on the film 14 which will vary in brightness in accordance with a predetermined pattern.

The appearance of the pattern can be varied within wide limits by controlling the speed of rotation of the filter 26, so that, if desired, any predetermined number of the traces on the film 14 may be positively identified by the frequencies of their respective intensity variations.

In Fig. 3, we have shown an arrangement generally similar to that of Fig. 1 but having a refinement by means of which the intensity of illumination of the film 14 may be automatically adjusted to conform to its speed of advance.

As will be noted, the system of Fig. 3 comprises the light source 10, the meters 11 and 12, the filters 21 and 22, and the rotatable filter 23, just as in Fig. 1. Similarly, drum 13 and film 14 are as in Fig. 1.

In the Fig. 3 system, however, we have provided an additional polarized filter 27, interposed in the light beam between the source 10 and the meters.

Filter 27 is positioned so as to provide the ratio of light intensities appropriate to the difference in speed between the recording of the readings of meters 11 and the recording of the readings of meters 12.

By way of illustration, suppose that meters 12 are being recorded at ten times the film speed at which meters 11 are recorded. This will of course mean that the amount of light which may be expected to strike a given point on film 14 as it passes the recording position will, other things being equal, be only one-tenth as great when the readings of meters 12 are being recorded. Hence, to accomplish the same degree of exposure, the light intensity, when meters 12 are being recorded, should be ten times as great as when the readings of meters 11 are being recorded.

Such variation in light intensity may, of course, be achieved by variation of the voltage applied to electric light source 10, but that technique is rather unsatisfactory. For one thing, it requires either an auto-transformer or a resistance bank, both of which are expensive. The resistance bank, in addition, will give off a great deal of unwanted heat. Voltage variation is an unsatisfactory method of intensity control for the additional reason that the color spectrum of incandescent lights tends to change radically with changes in filament temperature, with the result that, for a given film or sensitized paper, the relationship between voltage and effective intensity is by no means linear.

By the apparatus of Fig. 3, we provide a convenient means by which the light intensity may be adjusted at will without any of the aforementioned disadvantages. The system of Fig. 3 works as follows: The filter 23, it will be recalled, will normally occupy one of two positions, differing by substantially 90° in angular position. By appropriate adjustment of the angular position of filter 27, the relative light intensities transmitted in the two positions of filter 23 may be set at any desired values. Thus if filter 27 were set at a position such that its axis of polarization were at a 45° angle to the axis of polarization of filter 23 in either of its two positions, then the light transmitted to meters 11 and 12 respectively would be equal. On the other hand, if filter 27 be positioned so that its axis of polarization is in alignment with the axis of polarization of filter 23 in its position used for illumination of meters 12, then substantially no light would be available for illumination of meters 11 in the other position of filter 23. Between those two extremes, any desired ratios of intensity may be achieved by appropriate positioning of filter 27. Thus, in the example given in a foregoing paragraph, filter 27 would simply be adjusted so that the intensity of illumination of the meters 12 were ten times the intensity of illumination of meters 11, and the illumination per unit length of film 14 would thus be the same, regardless of which meters were being photographed.

While we have in this specification described in detail a system in which only one light source is employed, it will be understood that our invention is readily applicable to complex systems involving a multi-bank arrangement of meters and more than one light source.

Similarly, in some applications, three sets of meters equipped with filters aligned with their directions of polarization spaced apart by 120° may be used instead of the illustrated arrangement wherein two groups of filters are used with mutually perpendicular directions of polarization. When any angle other than substantially 90° is used as the angular spacing between the various groups of filters, the unwanted beams will not be completely cut off, but merely attenuated. In many applications, however, such attenuation will suffice. Accordingly, it is to be understood that our invention is not limited to applications wherein the various groups of filters are arranged with their directions of polarization mutually perpendicular.

Many other variations and changes in the illustrated systems may be made by persons skilled in the art without departing from the essence and spirit of our invention.

We claim:

1. In apparatus for recording photographically the readings of a plurality of meters as a function of time, a first meter having a movable light-reflecting element, a second meter having a movable light-reflecting element, a light source, a polarized light filter mounted between the light source and said first meter, the direction of polarization of said filter being at a predetermined angle, a second polarized light filter mounted between the light source and the other meter, the direction of polarization of said second filter being at a substantially different angle, a light-sensitive recording medium mounted to receive light rays from said light source as reflected from said light-reflecting elements, a third polarized light filter interposed between said light source and said meters, said third filter being positioned closely enough to said light source to intercept the light rays between said light source and both of said meters, said third filter being mounted for rotation between a first position in which its direction of polarization is substantially in alignment with that of said first filter and a second position wherein its said direction of polarization is substantially in alignment with that of said second filter, driving means for said recording medium operative to advance the same at a selected one of two driving speeds, manually operable speed-control means for said driving means operable to select either of said two driving speeds for said driving means, and means responsive to actuation of said control means for rotating said third filter between one of said positions and the other when said driving speed is changed.

2. In apparatus for recording photographically the readings of a plurality of meters as a function of time, a first meter having a movable light-reflecting element, a second meter having a movable light-reflecting element, a light source, a polarized light filter mounted between said light source and said first meter, the direction of polarization of said light filter being at a predetermined angle, a second polarized light filter mounted between said light source and said other meter, the direction of polarization of said second filter being at a substantially different angle, a light-sensitive recording medium mounted to receive light rays from the source as reflected from said light-reflecting elements, means for advancing said recording medium as a function of time, a third polarized light filter interposed between said light source and said meters, said third filter being mounted sufficiently near said light source to intercept the light rays between said source and both of said meters, said third filter being rotatable between a position in which its direction of polarization is substantially in alignment with that of said first filter and a position wherein its said direction of polarization is substantially in alignment with that of said second filter, and a fourth polarized light filter, said fourth filter being mounted for rotation in a position whereat it will intercept the light rays from said source toward said meters, said fourth filter being rotatably mounted for positioning at any selected angle, within a predetermined range, relative to the directions of polarization of said first and second filters, whereby the relative intensities of light reaching said first and second filters may be controlled.

3. In apparatus for recording photographically the readings of a plurality of meters as a function of time, a first meter having a movable light-reflecting element, a second meter having a movable light-reflecting element, a polarized light filter mounted in front of said first meter, the direction of polarization of said filter being at a predetermined angle, a second polarized light filter mounted in front of the other meter, the direction of polarization of said second filter being at a substantially different angle, a light source, a light-sensitive recording medium mounted to receive light rays from the source as reflected from said light-reflecting elements, driving means for said recording medium operative to advance the same at a selected one of two speeds, a third polarized light filter interposed between said light source and said meters, said third filter intercepting the rays between said source and both of said meters and being rotatable between a first position in which its direction of polarization is substantially in alignment with that of said first filter and a position wherein its said direction of polarization is substantially in alignment with that of said second filter, and a fourth polarized light filter mounted in the light path between said light source and said meters, the direction of polarization of said fourth filter being positioned with respect to those of both of said first and second filters at an angle operative to transmit light to said first and second filters respectively with intensities substantially proportional to said two speeds of said driving means.

4. Apparatus according to claim 1 having also a fourth polarized light filter in the light path between said source and said meters, said fourth filter being positioned with respect to the directions of polarization of both the first and second filters at an angle operative to transmit light to said first and second filters with predetermined relative intensities.

5. Apparatus according to claim 1 having also a fourth polarized light filter in the light path between said source and said meters, said fourth filter having its direction of polarization at an angle with respect to the directions of polarization of both the first and second filters, said angle being chosen to provide relative light intensities in the first and second positions of said third filter that are substantially proportional to the respective speeds of said driving means.

6. The apparatus of claim 1 having also an additional polarized light filter mounted between said light source and at least one of said meters, combined with means for continuously rotating said additional filter during operation of said advancing means.

7. In apparatus for recording photographically the readings of a plurality of meters as a function of time, a first meter having a movable light-reflecting element, a second meter having a movable light-reflecting element, a polarized light filter mounted in front of the first meter, the direction of polarization of said filter being at a predetermined angle, a second polarized light filter mounted in front of the other meter, the direction of polarization of said second filter being substantially perpendicular to the direction of polarization of said first filter, a light source, a light-sensitive recording medium mounted to receive light rays from the source as reflected from said light-reflecting elements, means for advancing said recording medium as a function of time, a third polarized light filter interposed between said light source and said meters, said third filter being rotatable between a position in which its direction of polarization is substantially in alignment with that of said first filter and a postion wherein its said direction of polarization is substantially in alignment with that of said second filter, and a fourth polarized light filter mounted between said light source and at least one of said meters, combined with means for continuously rotating said additional filter during operation of said advancing means.

References Cited in the file of this patent

UNITED STATES PATENTS

| | | |
|---|---|---|
| 1,879,793 | Chubb | Sept. 27, 1932 |
| 2,280,297 | Neumueller et al. | Apr. 21, 1942 |
| 2,294,382 | Burian | Sept. 1, 1942 |
| 2,635,034 | Haviland | Apr. 14, 1953 |
| 2,645,552 | Stevinson | July 14, 1953 |